(12) United States Patent
Roy

(10) Patent No.: US 7,590,104 B1
(45) Date of Patent: Sep. 15, 2009

(54) SYSTEM AND METHOD FOR GATEKEEPER-TO-GATEKEEPER COMMUNICATION

(75) Inventor: Radhika R. Roy, Howell, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 728 days.

(21) Appl. No.: 10/773,788

(22) Filed: Feb. 6, 2004

Related U.S. Application Data

(63) Continuation of application No. 09/328,667, filed on Jun. 9, 1999, now Pat. No. 6,965,591.

(60) Provisional application No. 60/100,130, filed on Sep. 14, 1998.

(51) Int. Cl.
*H04L 12/00* (2006.01)
(52) U.S. Cl. ............................. 370/352; 370/401

(58) Field of Classification Search ......... 370/351–356, 370/400, 401–404; 379/223–227; 709/223–227
See application file for complete search history.

(56) References Cited

U.S. PATENT DOCUMENTS

| 5,790,536 | A | * | 8/1998 | Mahany et al. .............. 370/338 |
| 6,154,463 | A | * | 11/2000 | Aggarwal et al. ........... 370/408 |
| 6,374,302 | B1 | * | 4/2002 | Galasso et al. .............. 709/238 |

* cited by examiner

*Primary Examiner*—Michael J Moore, Jr.
*Assistant Examiner*—Duc T Duong

(57) ABSTRACT

A method for communication employs a plurality of gatekeepers and involves receiving at a first gatekeeper a request for information. If the information is not known by the first gatekeeper, a request is sent via a second gatekeeper to a third gatekeeper for the information. If the information is known by the third gatekeeper, it is returned to the first gatekeeper, illustratively via the second gatekeeper. The gatekeepers are at a single gatekeeper hierarchical level.

22 Claims, 5 Drawing Sheets

SYSTEM AND METHOD FOR GATEKEEPER-TO-GATEKEEPER COMMUNICATION

CROSS-REFERENCE TO RELATED APPLICATION

This is a continuation of U.S. patent application Ser. No. 09/328,667 filed Jun. 9, 1999, now U.S. Pat. No. 6,965,591 which claimed the benefit of U.S. Provisional Application No. 60/100,130, filed Sep. 14, 1998.

FIELD OF THE INVENTION

The present invention involves network communication. In particular, the present invention introduces systems and methods for gatekeeper-to-gatekeeper communication for any combination of inter-zone and inter-domain gatekeepers.

BACKGROUND

The International Telecommunication Union-Telecommunication (ITU-T) has developed a recommended standard for Packet-Based Multimedia Communications Systems. The standard is called H.323. The recommendation envisions that there can be one or more zones in a given H.323 communications system. A zone can contain H.323 functional entities such as terminals, gateways, multipoint control units (MCUs), communications networks, and their resources including bandwidth, ports, buffers, and others.

H.323 mandates that a functional entity, which is called a gatekeeper, manages the resources within a given zone. A gatekeeper is an intelligent functional entity used to transfer signaling messages into and out of zones and domains, and contains the intelligence necessary to establish communication between communicating entities. Typically, the gatekeeper manages a single zone.

H.323 systems, however, are not limited to single zones. In fact, a large H.323 system can consist of multiple zones with a boundary between the zones. The zone boundary can be physical or logical.

While the H.323 standard defines certain requirements, the standard does have some gaps. For example, typically, certain H.323 signaling messages are transmitted between H.323 entities and the gatekeeper in a given zone only. These signaling messages include location, zone admission, bandwidth, discovery, registration, and/or other signaling messages. These messages, however, may have to travel between multiple gatekeepers in their respective source-destination paths because the first receiving gatekeeper may not be able to process the signaling message. If the first gatekeeper cannot process the signaling message, it is sent for processing to another zone's gatekeeper. The H.323 standards do not specify how these signaling messages can be sent between the gatekeepers in a multiple-gatekeeper environment.

Further gaps exist in H.323 requirements. For example, H.323 does not specify the possible logical architectural relationships between the gatekeepers for communications. If the gatekeepers are arranged in a hierarchical relationship, a hierarchical gatekeeper architecture may not even maintain a zone. Rather, the gatekeeper may manage a number of gatekeepers that maintain the respective zones. In a distributed non-hierarchical gatekeeper architecture, there are no specified mechanisms for signaling between gatekeepers.

In addition, H.323 does not provide any caching management mechanisms for the information to be acquired dynamically between the gatekeepers. Moreover, there is no notion of gatekeeper-level routing so that messages can be sent between the gatekeeper for resolving the required information where multiple gatekeepers are involved. These signaling messages lack the required fields that will facilitate the notion of routing between the gatekeepers considering the multiple gatekeepers either in multiple zones of the giving domain and/or in multiple domains where a domain consists of one or more zones.

SUMMARY OF THE INVENTION

To alleviate the problems in the prior art, the present invention introduces systems and methods for communication using gatekeeper-to-gatekeeper communication, using both inter-zone and inter-domain protocols and architectures. The invention facilitates inter-gatekeeper communications among the zones either in a given domain, or between domains, in a distributed, hierarchical, or hybrid (distributed and hierarchical) architecture. This can be done in several ways. For example, but not the only example, intergatekeeper communication can be facilitated by dynamically acquiring knowledge of the destinations served by other gatekeepers, or resources, quality-of-service, security features, pricing, traffic, and other information. As another example, but not the only example, intergatekeeper communication can be facilitated by various types of cache management and extension of the existing H.323 signaling messages.

In one embodiment of the present invention, a method for communication is disclosed, the method comprising the steps of receiving at a first gatekeeper a request for information and determining whether the information is known by the first gatekeeper. If the information is not known by the first gatekeeper, the request is sent via a logical gatekeeper-level path to a second gatekeeper. If the second gatekeeper knows the information, it sends the information, via a logical gatekeeper-level path, to the first gatekeeper.

It should be noted that a gatekeeper is an application-level entity. The lower network (e.g., routers) or link (e.g., switches) layer entities perform actual routing of messages among themselves to send the signaling messages between the gatekeepers at the instantiation of the application-layer gatekeeper request.

DETAILED DESCRIPTION

The present invention provides systems and methods for efficient inter-zone or inter-network communication using a gatekeeper-to-gatekeeper protocol.

Figure 1:
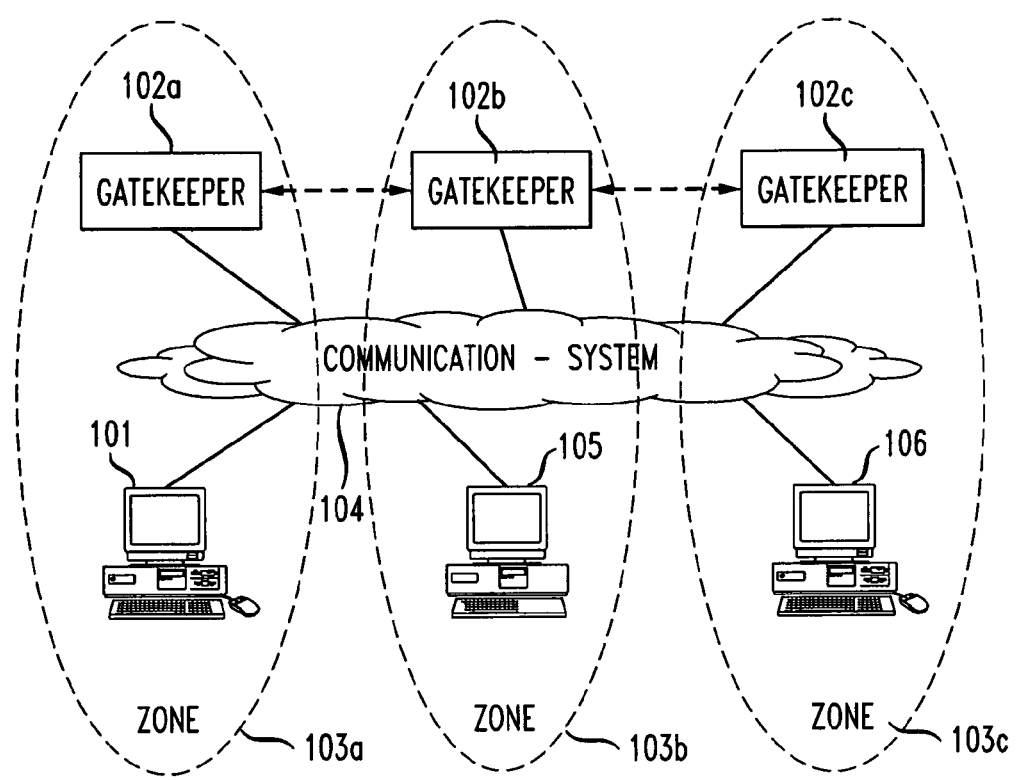
FIG. 1 is a system overview of an embodiment of the present invention for inter-zone communications in which one gatekeeper in a given zone is communicating with other gatekeepers in a distributive-gatekeeper-architecture requirement.

FIG. 1 is a system overview of a distributed gatekeeper system in which each gatekeeper manages and controls to its zone. Note that each gatekeeper does not have to be tied to a specific zone based on a physical boundary. The zone boundary can be logical, as well. Additionally, each gatekeeper can manage and control entry into a distinct domain or network, or there can be a combination of gatekeepers controlling any combination of zones and networks. Thus, for the purposes of the present invention, the gatekeepers are not necessarily inter-zoned gatekeepers. The gatekeepers can be inter-networked gatekeepers such that each gatekeeper is connected to a different network or domain.

In FIG. 1, subscriber terminal 101 and other entities of zone 103a can communicate with gatekeeper 102a for sending, receiving and resolving information. Similarly, subscriber terminal 105 (106) and other entities of zone 103b (103c) can communicate with gatekeeper 102b (102c). Gatekeeper 102a can also interact with gatekeeper 102b. Thus, gatekeeper 102a can receive a request for information from subscriber 101. Gatekeeper 102a can pass the query along to gatekeeper 102b. Gatekeeper 102a can also contain a database in which gatekeeper 102a stores the requested information. Gatekeeper 102b and 102c in this embodiment can receive and send queries, and can contain a database in which various information can be stored. This information includes, but is not limited to, addresses, pricing, quality of service, resources, security features, and other information. Note that FIG. 1 portrays gatekeepers 102a through 102c, although in general there can be an arbitrary number of gatekeepers.

In one embodiment of the present invention, gatekeeper 102a can receive from subscriber 101 a query for some kind of information. This information can be any network address, the address of an application-layer resource, middleware-layer resource, transport-layer resource, and/or a network-layer resource. These resources can include, but are not limited to, bandwidth, ports, buffers, links/trunks, control processing units (CPUs) capacity, and quality-of-service parameters.

After receiving the query, gatekeeper 102a can attempt to resolve the query by searching its database for the network address. If gatekeeper 102a cannot resolve the query, for example, if gatekeeper 102a does not contain a requested IP address in its database, then gatekeeper 102a can query the next gatekeeper, in this case gatekeeper 102b. Gatekeeper 102b receives the query from gatekeeper 102a, and again attempts to resolve the query by searching its database. If gatekeeper 102b cannot resolve the query, then gatekeeper 102b passes the query along to the next gatekeeper, in this case gatekeeper 102c. This process continues until a gatekeeper can resolve the query.

When gatekeeper 102c resolves the query, that is, when gatekeeper 102c searches its database and finds the requested network address, for example, gatekeeper 102c can send the network address back to gatekeeper 102a along the reverse path that the query was originally sent through gatekeeper 102b. As each gatekeeper in the path receives the network address, it can store the information so that, in the future, the query can be resolved along a shorter path. Gatekeeper 102a, the originating gatekeeper, can pass the network address on to subscriber 101 so that subscriber 101 can attempt to connect to the person using the known network address. In another embodiment of the present invention, gatekeeper 102a can route the call itself using the received network address.

Zones 103a, 103b and 103c are bound by communication-system entity 104. For the purposes of this application, a communication-system entity can be a local area network, an Internet protocol network, an asynchronous transfer mode network, a frame relay network, and/or any other network. Additionally, a communication-system entity like a gatekeeper can be a middleware- or application-layer communication entity embedded above the network layer. Routers or switches, however, are lower network-layer, or link-layer, entities. These lower-layer entities will actually route the message between themselves to send the messages at the instantiation of the application-layer entity like the gatekeeper. In this way, the messages can be send between gatekeepers via the logical gatekeeper path.

Because the reply returns along the original path, all the intermediate gatekeepers can cache the information for some predetermined amount of time. The next time a subscriber requests that information, a gatekeeper can respond directly without forwarding the requests. Note that the reply does not have to traverse the original path, but can return along some variant of the original path. Additionally, the information does not necessarily have to be cached along the return path.

Figure 2:
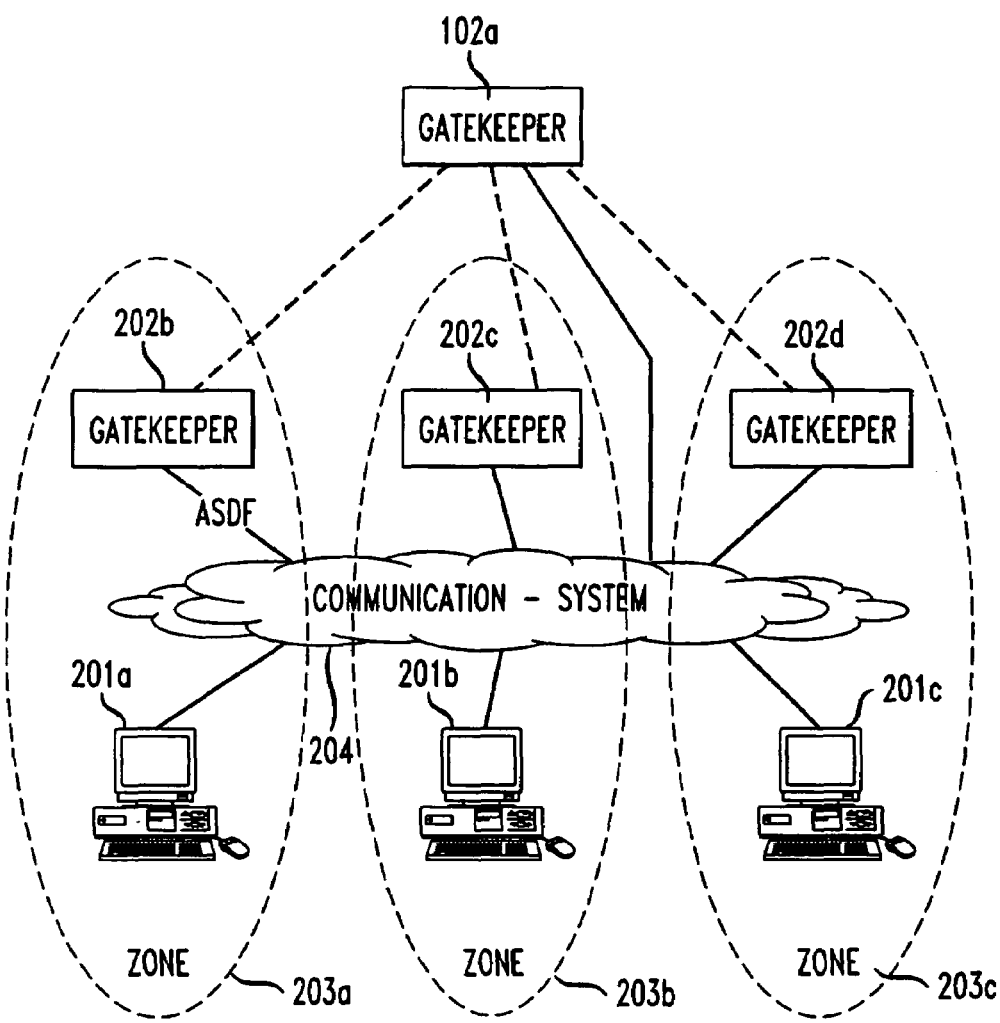
FIG. 2 is a system overview of an embodiment of the present invention for inter-domain communications in a hierarchical-gatekeeper-architecture environment.

FIG. 2 is a system overview of a centralized gatekeeper system in which gatekeepers are arranged in a hierarchical form. In this embodiment, gatekeeper 202a is a centralized gatekeeper through which gatekeepers 202b, 202c and 202d interact. Gatekeepers 202b, 202c and 202d manage, in this Figure, zones 203a, 203b and 203c, respectively. As in the distributed architecture, these gatekeepers can manage domains rather than zones. In this embodiment, gatekeeper 202a does not manage any one zone or domain. Gatekeeper 202a's function is to tie together the various gatekeepers that are lower in the hierarchy (e.g., 202b, 202c and 202d). In another embodiment of the present invention, a gatekeeper can be a centralized gatekeeper (connecting other gatekeepers together) while, at the same time, managing a zone or domain of its own. Note that the communication paths between the gatekeepers are always predefined.

In the embodiment represented by FIG. 2, gatekeeper 202b can receive a request for information from terminal 201a. Gatekeeper 202b can determine whether it has the requested information. If it does, it can send the information to terminal 201a.

If gatekeeper 202b does not contain the requested information, it can send a query to other gatekeepers through centralized gatekeeper 202a. Gatekeeper 202a can receive a request for information from gatekeeper 202b (or any gatekeeper) and can send that request to any gatekeeper beneath it in the hierarchy. Alternatively, gatekeeper 202a can know which gatekeeper to contact for the information, and the request will be sent to the corresponding gatekeeper by gatekeeper 202a. Central gatekeeper 202a can keep all information of all gatekeepers in its memory (but this is not necessary), and sends the response to the requesting gatekeeper of the lower hierarchy.

Figure 3:
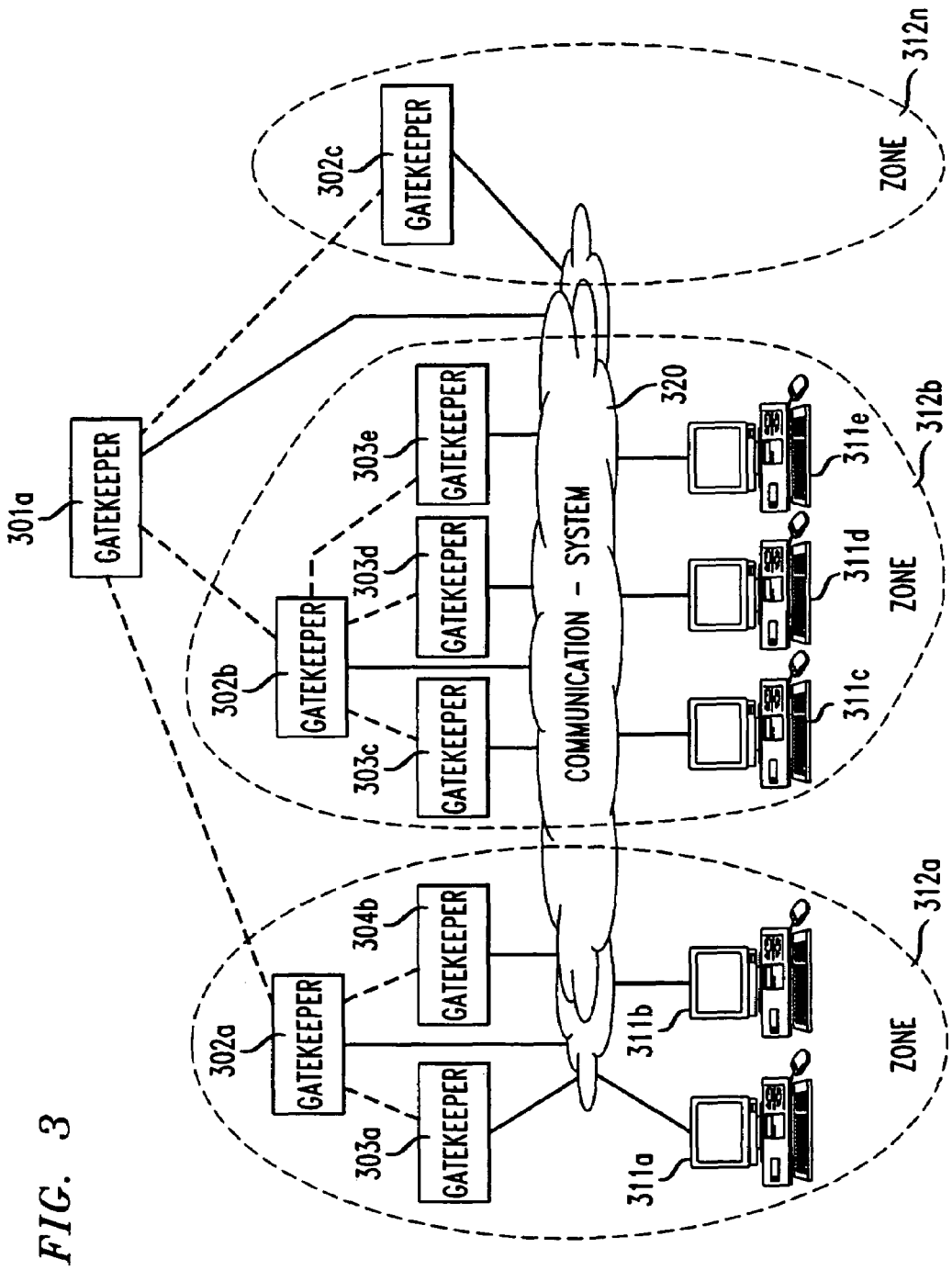
FIG. 3 is a system overview of an embodiment of the present invention for inter-domain communications in a layered hierarchical-gatekeeper-architecture environment.

FIG. 3 is an embodiment of the present invention in which the gatekeepers are arranged in a centralized or hierarchical form that contains multiple domains and multiple levels of hierarchical gatekeepers. In this embodiment of the present invention, gatekeeper 301a is a centralized gatekeeper in the sense that it functions only to connect other gatekeepers with one another, and does not manage any domain or zone. In this embodiment, gatekeeper 301a is logically connected to gatekeepers 302*a*, 302*b*, and 302*c*, all of which are centralized or hierarchical gatekeepers in the same sense as gatekeeper 301*a*. Gatekeeper 302*a*, for example, functions only to connect logically gatekeepers 303*a* and 303*b* with each other; it does not manage any domain or zone.

In another embodiment of the present invention, gatekeeper 301*a*, 302*a*, 303*b* and 303*c*, or any combination thereof, can each manage a domain or zone while connecting other gatekeepers lower down in the hierarchy.

For example, gatekeeper 302*a* manages domain 312*a*, while domain 312*a* consists of two zones (not shown in FIG. 3) managed by gatekeepers 303*a* and 303*b*. This is, hierarchical gatekeeper 302*a* has the knowledge of the domain to resolve information while the zonal gatekeepers can resolve information that is resident to their respective zones. The same is true for domains 312*b* and 312*n*. Gatekeeper 301*a*, however, has the knowledge to resolve information of all domains such as 312*a*, 312*b*, and 312*n*. If gatekeepers 302*a*, 302*b* and 302*n* are considered at hierarchical level 1, gatekeeper 301*a* can be considered at hierarchical level 2. Clearly, one can create many hierarchical levels of gatekeepers. Conceptually, the communication between gatekeepers 301*a*, 302*a*, 302*b* and 302*n* can be considered as inter-domain communications. For the sake of generality, one can consider that gatekeeper 301*a* maintains its own domain.

Figure 4:
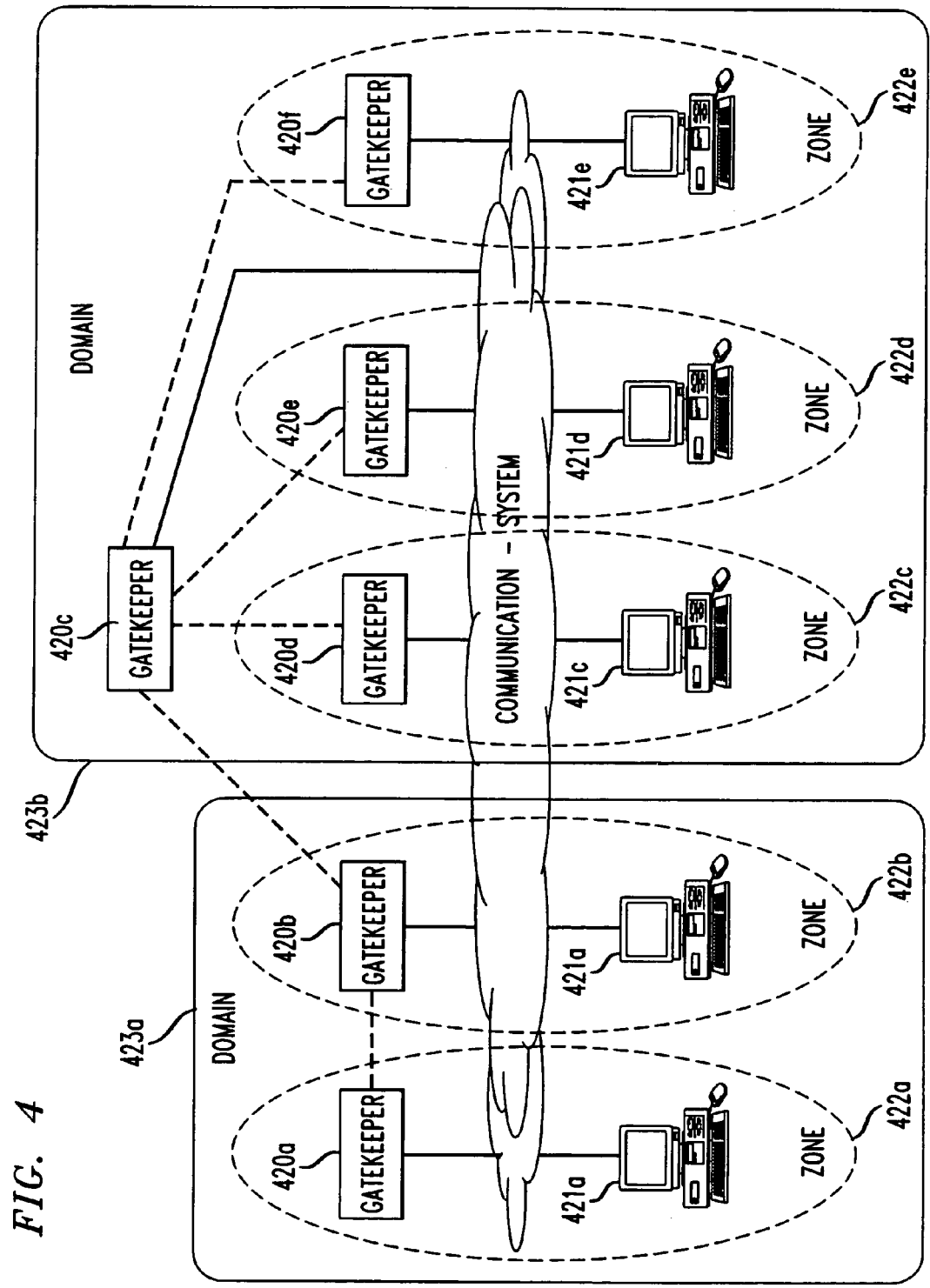
FIG. 4 is a system overview of an embodiment of the present invention for inter-domain communications in a hybrid gatekeeper-architecture environment.

FIG. 4 is a system overview of an embodiment of the present invention featuring gatekeepers arranged in a hybrid architecture consisting of both distributed and centralized (or hierarchical) architecture. In this embodiment, gatekeepers 420*a* and 420*b* communicate in a distributed environment with domain 423*a*, each managing zones 422*a* and 422*b*, respectively. Centralized gatekeeper 420*c*, in the meantime, manages communication between gatekeepers 420*d*, 420*e*, and 420*f* in domain 423*b*, while gatekeepers 420*d*, 420*e* and 420*f* manage zones 422*c*, 422*d*, and 422*e*, respectively.

In this Figure, communications between domains 423*a* and 423*b* occur via gatekeepers 420*b* and 420*c*.

The communication between gatekeepers within domain 423*a* occurs in a distributed manner while gatekeepers in domain 423*b* communicate in a hierarchical manner. The communication flow for requesting and receiving information in domain 423*a* will take place as in a distributed gatekeeper architecture that has been described in the case of FIG. 1, while the communications in domain 423*b* will take place in a hierarchical manner that has been described in the case of FIG. 2. Gatekeeper 420*b*, however, will communicate with centralized gatekeeper 420*c*, and this form of communication will constitute inter-domain communication between domains 423*a* and 423*b*.

Figure 5:
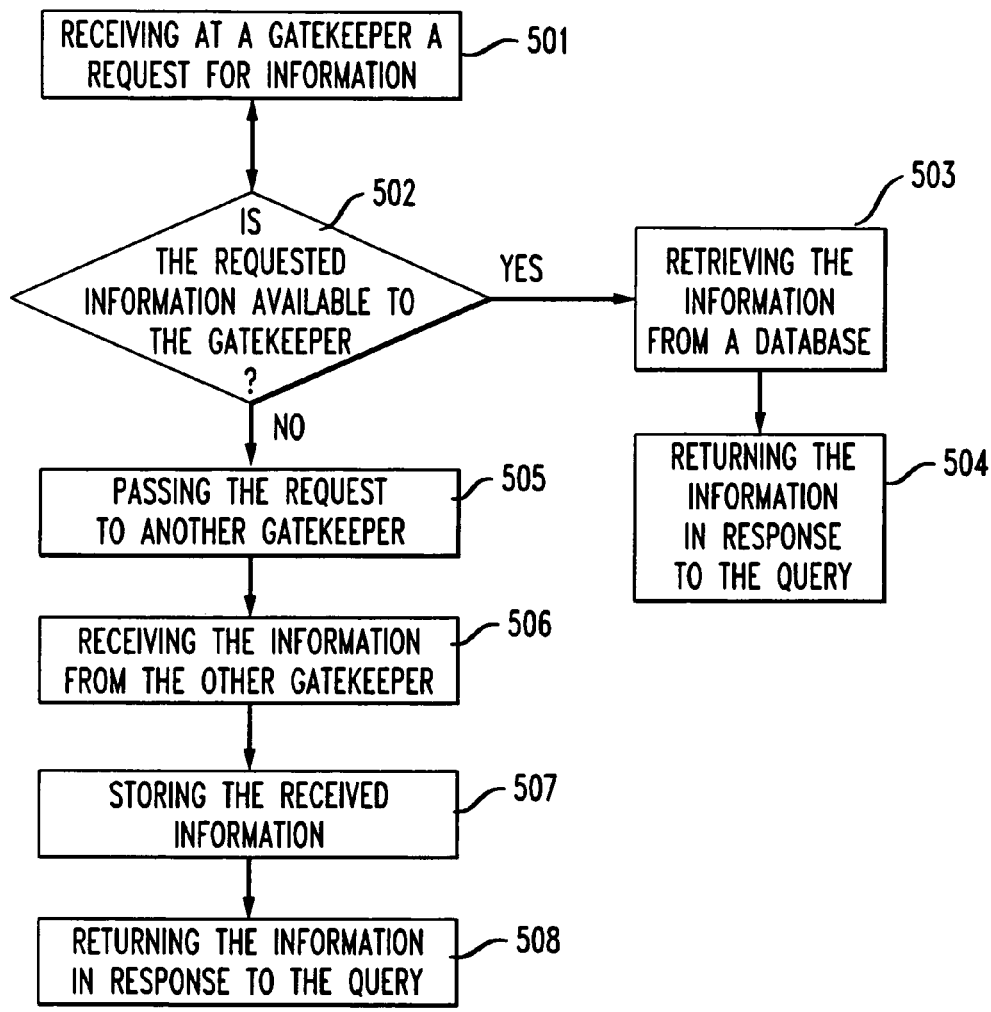
FIG. 5 is a flow chart depicting an embodiment of the present invention.

FIG. 5 is a flow chart of a method of practicing the present invention according to at least one embodiment of the present invention. It should be appreciated that the flow chart and the claims are not intended to imply a mandatory order to the invention. Rather, the steps of the flow chart and the steps of the claims can be performed in any practicable order.

At step 501, a gatekeeper receives a request for information. This request for information can include a request to resolve a network address, or a request for resource information such as application-layer, middleware-layer, transport-layer and/or network-layer resources such as bandwidth, ports buffers, links/trunks, CPU capacity, and/or quality of service and performance parameters. The query can also contain registration, admission, and status signaling messages. These signaling messages can be used by a gatekeeper to handle the query.

At step 502, it is determined whether the requested information is known by the first gatekeeper. If the information is known by the first gatekeeper, then at step 503 the information is retrieved from the database and the network address is returned to the querying entity in response to the query at step 504. If the information is not known by the first gatekeeper, then at step 505 the query is passed to a second gatekeeper. The choice of the second gatekeeper can be based on the decision that will provide the best possible gatekeeper-level logical path through which the signaling message will be routed between the gatekeepers. At step 506, the information is received from the second gatekeeper. The response to the query will always be received from the second gatekeeper (if the second gatekeeper is queried). This is because, even if the second gatekeeper cannot resolve the query, the resolved query will be returned to the first gatekeeper along a reverse path that the query originally travels.

At step 507, the received information is stored in the first gatekeeper's database. At step 508, the address is returned by the first gatekeeper in response to the originally-received query.

The gatekeeper serving the destination of the request for information (i.e., the last gatekeeper in the chain) can cache all resolution requests to which it has responded. The cache can help this gatekeeper to issue a "deregistration" or "parameter change" (e.g., bandwidth change) request if the information from all resolution requests to which it has responded in the reply has the possibility of changing during its lifetime.

In a multiple gatekeeper environment, a maximum limit can be provided for how many gatekeepers that a request can traverse before being discarded. This field can be defined as a hop count. The hop count indicates the maximum number of hop counts between the gatekeepers that a signaling message is allowed to traverse before being discarded. This field is set based on a design parameter beyond the scope of this invention, and its value depends on the specific implementation scheme of the underlying transport networking technologies.

In one embodiment of the present invention, each gatekeeper decrements the hop count by a quantity depending on the value that is being allocated for a path as the signaling message transits the gatekeeper on its way to the next gatekeeper along the logical-gatekeeper-routed path to the destination. If a gatekeeper receives a message that should be forwarded to another gatekeeper, and that message contains a hop count set to zero, then the gatekeeper sends an error-indication message back to the source entity, and the message is dropped. If a responding gatekeeper replies to the request, then a gatekeeper places a value in hop count as if it were sending a request of its own.

Using this hop count, each gatekeeper can decrement this hop-count field as a signaling message transits the gatekeeper on the way to the next gatekeeper along the path to the destination. The gatekeeper-level hop count is only considered in the context of the number of gatekeepers. Between any two gatekeepers, however, there can be one or many network (e.g. routers) or link (e.g., switches) layer entities that actually route the packets or calls among themselves. This application-layer hop count can be translated into the corresponding lower networking-layer hop count or other functional entities as appropriate depending on the corresponding transport networking technologies. In other words, the hop count is not limited to counting gatekeepers; the hop count can measure counting other entities as well.

In another embodiment of the present invention, the response to the query is assigned a time-to-live field. This field specifies the holding time for which the response to the query is considered valid. In this context, if the response to the query is cached, the cached information is valid up to the time specified in the time-to-live field. Thus, a transit gatekeeper lying along the path between the source entity and the responding gatekeeper can cache source binding information contained in the resolution message that it can then forward if the time-to-live value is greater than zero.

There are a number of other fields that can be sent in the request for information from one gatekeeper to another. These fields include, but are not limited to, a field keeping track of the various gatekeeper identifiers (i.e., a way of using data to refer to the various gatekeepers) and a field relating to end of the query chain at which the information is known.

In one embodiment of the present invention, when an entity desires information, it can use the corresponding registration, admission and status signaling message with an extension of the hop count, gatekeeper identifier and the last entity in the query chain. These additional three fields facilitate routing signaling messages between gatekeepers using the notion of the gatekeeper-level path to avoid looping and other associated problems.

If a determination is made that no gatekeeper in the system can reply to the request for the destination address, then a negative reply is returned.

Figure 6:
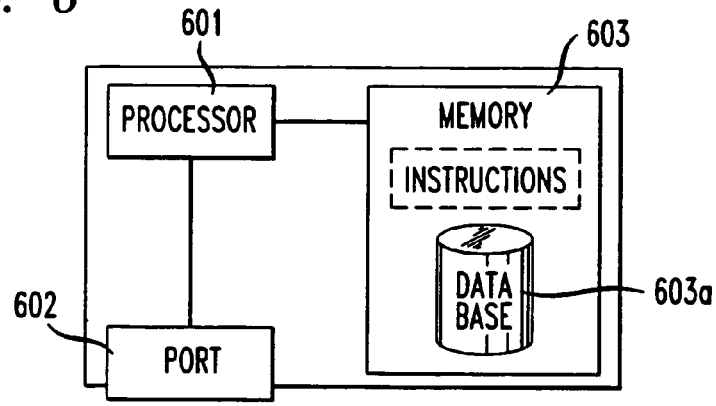
FIG. 6 is a block diagram of an embodiment of the present invention comprising a processor and a memory.

FIG. 6 is a block diagram of an apparatus according to an embodiment of the present invention. In this embodiment, processor 601 is coupled to said port 602. Port 602 can receive a query and send a response to a query. Memory 603 is coupled to said processor 601. Memory 603 stores the instructions adapted to run on said processor to perform any method embodiment of the present invention. For example, memory 603 can store instructions adapted to be run on processor 601 to receive a request for information, determine whether the information is known by the gatekeeper, and if not, passing the query to another gatekeeper. In response the information can be received from the other gatekeeper, stored in memory 602*a*, and returned to querying entity. Memory 603 can contain database 603*a*. Database 603*a* can store network addresses that can be retrieve and passed along to processor 601 for transmission through port 602.

For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method for use in a communication system, the communication system including at least first, second and third gatekeepers having respective associated subscriber terminals, the method comprising the first gatekeeper receiving a request for information from one of its associated subscriber terminals;

if the information is not known by the first gatekeeper, the first gatekeeper sending the request only to the second gatekeeper, if the information is not known by the second gatekeeper, the second gatekeeper sending the request only to the third gatekeeper, and if the information is known by the third gatekeeper, the third gatekeeper sending the information to the first gatekeeper, wherein each of the first, second and third gatekeepers communicates with its respective associated subscriber terminals over a respective communication path that does not include any other gatekeeper, wherein each of the first, second and third gatekeepers establishes communication among its associated subscriber terminals, and wherein the communication between the subscriber terminals associated with the first gatekeeper passes through no gatekeeper other than the first gatekeeper, the communication between the subscriber terminals associated with the second gatekeeper passes through no gatekeeper other than the second gatekeeper, and the communication between the subscriber terminals associated with the third gatekeeper passes through no gatekeeper other than the third gatekeeper.

2. The method of claim 1 wherein the third gatekeeper sends the information to the first gatekeeper via the second gatekeeper.

3. The method of claim 1 wherein the requested information is an address.

4. The method of claim 3 wherein said address is an application address, a network address or a resource address.

5. The method of claim 1 wherein the requested information is information about a resource.

6. The method of claim 5 wherein said resource is one of: bandwidth, a port, a buffer, a link, a trunk, processing unit capacity, and a quality-of-service parameter.

7. The method of claim 1 wherein each of the gatekeepers is adapted to use signaling messages conforming to International Telecommunications Union standard H.323 to receive and transmit information between at least itself and its respective subscriber terminals.

8. A communication system comprising at least first, second and third gatekeepers and a plurality of communicating entities, the first, second and third gatekeepers being configured to receive and transmit signaling messages among themselves, wherein the first gatekeeper directly communicates gatekeeper-to-gatekeeper information request signaling messages only with the second gatekeeper, wherein the second gatekeeper directly communicates gatekeeper-to-gatekeeper information request signaling messages with the first gatekeeper and the third gatekeeper, wherein the third gatekeeper directly communicates gatekeeper-to-gatekeeper information request signaling messages with the second gatekeeper but not with the first gatekeeper, wherein the first, second and third gatekeepers are all at a single gatekeeper hierarchical level within the communication system, wherein each of the first, second and third gatekeepers is configured to receive and transmit signaling messages between itself and associated ones of the communicating entities over a respective communication path that does not include any other gatekeeper, wherein each of the first, second and third gatekeepers is further configured to establish communication between its associated communicating entities, and wherein the communication between the communicating entities associated with the first gatekeeper passes through no gatekeeper other than the first gatekeeper, the communication between the communicating entities associated with the second gatekeeper passes through no gatekeeper other than the second gatekeeper, and the communication between the communicating entities associated with the third gatekeeper passes through no gatekeeper other than the third gatekeeper.

9. The system of claim 8 wherein ones of said gatekeeper-to-gatekeeper signaling messages include requests for at least one of an application address, a network address and a resource address.

10. The system of claim 8 wherein ones of said gatekeeper-to-gatekeeper signaling messages include requests for information about a resource.

11. The system of claim 10 wherein said resource is one of: bandwidth, a port, a buffer, a link, a trunk, processing unit capacity, and a quality-of-service parameter.

12. The system of claim 8 wherein at least said gatekeeper-to-gatekeeper signaling messages conform to an international standard for packet-based communications.

13. The system of claim 8 wherein at least ones of the communicating entities are terminals, gateways, multipoint control units or communication networks.

14. The system of claim 1 wherein the first gatekeeper is configured to cache information received by the first gatekeeper from another one of the gatekeepers so that if the first gatekeeper is again requested for said information, the first gatekeeper will be able to provide said information to the source of the request.

15. The system of claim 8 wherein each particular gatekeeper that receives requested information from another one of the gatekeepers stores that information within that particular gatekeeper so that if that particular gatekeeper is again requested for said information, it will be able to provide said information to the source of the request.

16. A method for use in a communication system in which at least first, second and third gatekeepers are each connected to one or more associated subscriber terminals via one or more networks, in which each of the at least first, second and third gatekeepers has a respective associated database, and in which each of the at least first, second and third gatekeepers, in response to a request for information from a requesting one of its associated subscriber terminals, provides the requested information from that gatekeeper's associated database to the requesting subscriber terminal if that gatekeeper's associated database contains the requested information, the method comprising the first gatekeeper receiving from a requesting one of its associated subscriber terminals a request for information that is not contained in the database associated with the first gatekeeper, the first gatekeeper sending the request only to the second gatekeeper, if the information is not contained in the database associated with the second gatekeeper, the second gatekeeper sending the request only to the third gatekeeper, and if the information is contained in the database associated with the third gatekeeper, the third gatekeeper sending the information to the first gatekeeper, wherein each of the first, second and third gatekeepers is configured to receive and transmit signaling messages between itself and its associated subscriber terminals over a respective communication path that does not include any other gatekeeper, wherein each of the first, second and third gatekeepers is further configured to establish communication between its associated subscriber terminals, and wherein the communication between the subscriber terminals associated with the first gatekeeper passes through no gatekeeper other than the first gatekeeper, the communication between the subscriber terminals associated with the second gatekeeper passes through no gatekeeper other than the second gatekeeper, and the communication between the subscriber terminals associated with the third gatekeeper passes through no gatekeeper other than the third gatekeeper.

17. The invention of claim 16 wherein the third gatekeeper sends the information to the first gatekeeper via the second gatekeeper.

18. The invention of claim 16 wherein the requested information is an address.

19. The invention of claim 18 wherein said address is an application address, a network address or a resource address.

20. The invention of claim 16 wherein the requested information is information about a resource.

21. The invention of claim 20 wherein said resource is one of: bandwidth, a port, a buffer, a link, a trunk, processing unit capacity, and a quality-of-service parameter.

22. The invention of claim 16 wherein each of the gatekeepers is configured to use signaling messages conforming to International Telecommunications Union standard H.323 to receive and transmit information between at least itself and its respective subscriber terminals.

* * * * *